US009256727B1

(12) United States Patent
Manmohan

(10) Patent No.: US 9,256,727 B1
(45) Date of Patent: Feb. 9, 2016

(54) SYSTEMS AND METHODS FOR DETECTING DATA LEAKS

(71) Applicant: Symantec Corporation, Mountain View, CA (US)

(72) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 2 days.

(21) Appl. No.: 14/185,249

(22) Filed: Feb. 20, 2014

(51) Int. Cl.
  *G06F 17/00* (2006.01)
  *G06F 21/50* (2013.01)
  *G06F 21/60* (2013.01)
  *G06F 21/55* (2013.01)

(52) U.S. Cl.
  CPC ............... *G06F 21/50* (2013.01); *G06F 21/60* (2013.01); *G06F 21/55* (2013.01)

(58) Field of Classification Search
  CPC .......... G06F 21/60; G06F 21/55; G06F 21/50
  See application file for complete search history.

(56) References Cited

U.S. PATENT DOCUMENTS

| 7,996,374 | B1* | 8/2011 | Jones et al. | 707/694 |
|---|---|---|---|---|
| 8,544,060 | B1 | 9/2013 | Khetawat | |
| 8,868,728 | B2* | 10/2014 | Margolies et al. | 709/224 |
| 9,003,542 | B1* | 4/2015 | MacKay | G06F 21/50 726/26 |
| 2009/0254572 | A1* | 10/2009 | Redlich | G06Q 10/06 |
| 2010/0162347 | A1* | 6/2010 | Barile | 726/1 |
| 2012/0131012 | A1* | 5/2012 | Taylor | G06Q 10/00 707/748 |
| 2012/0151551 | A1* | 6/2012 | Readshaw et al. | 726/1 |
| 2012/0210388 | A1* | 8/2012 | Kolishchak | 726/1 |
| 2012/0291087 | A1* | 11/2012 | Agrawal | 726/1 |
| 2013/0019309 | A1* | 1/2013 | Strayer et al. | 726/23 |
| 2015/0163121 | A1* | 6/2015 | Mahaffey et al. | H04L 12/26 |

OTHER PUBLICATIONS

"Websense Products", http://www.websense.com/content/websense-products.aspx, as accessed Dec. 17, 2013, Websense, Inc., (Jan. 16, 2013).
"McAfee", http://www.mcafee.com, as accessed Dec. 17, 2013, McAfee, Inc., (Feb. 29, 2000).
"RSA", http://www.emc.com/domains/rsa/index.htm, as accessed Dec. 17, 2013, EMC Corporation, (Feb. 27, 2012).
Binu Chandrasekara Pillai, et al; Systems and Methods for Optimizing Data Loss Prevention Systems; U.S. Appl. No. 14/254,874, filed Apr. 16, 2014.

* cited by examiner

*Primary Examiner* — Techane Gergiso
(74) *Attorney, Agent, or Firm* — ALG Intellectual Property, LLC

(57) ABSTRACT

A computer-implemented method for detecting data leaks may include (1) monitoring at least one data-distribution channel utilized by an entity, (2) detecting a plurality of full DLP policy violations and/or partial DLP policy violations committed by the entity by analyzing data distributed by the entity via the data-distribution channel, (3) determining that the entity's DLP policy violations cumulatively exceed a predetermined threshold, and (4) performing a security action in response to determining that the entity's DLP policy violations cumulatively exceed the predetermined threshold. Various other methods, systems, and computer-readable media are also disclosed.

20 Claims, 7 Drawing Sheets

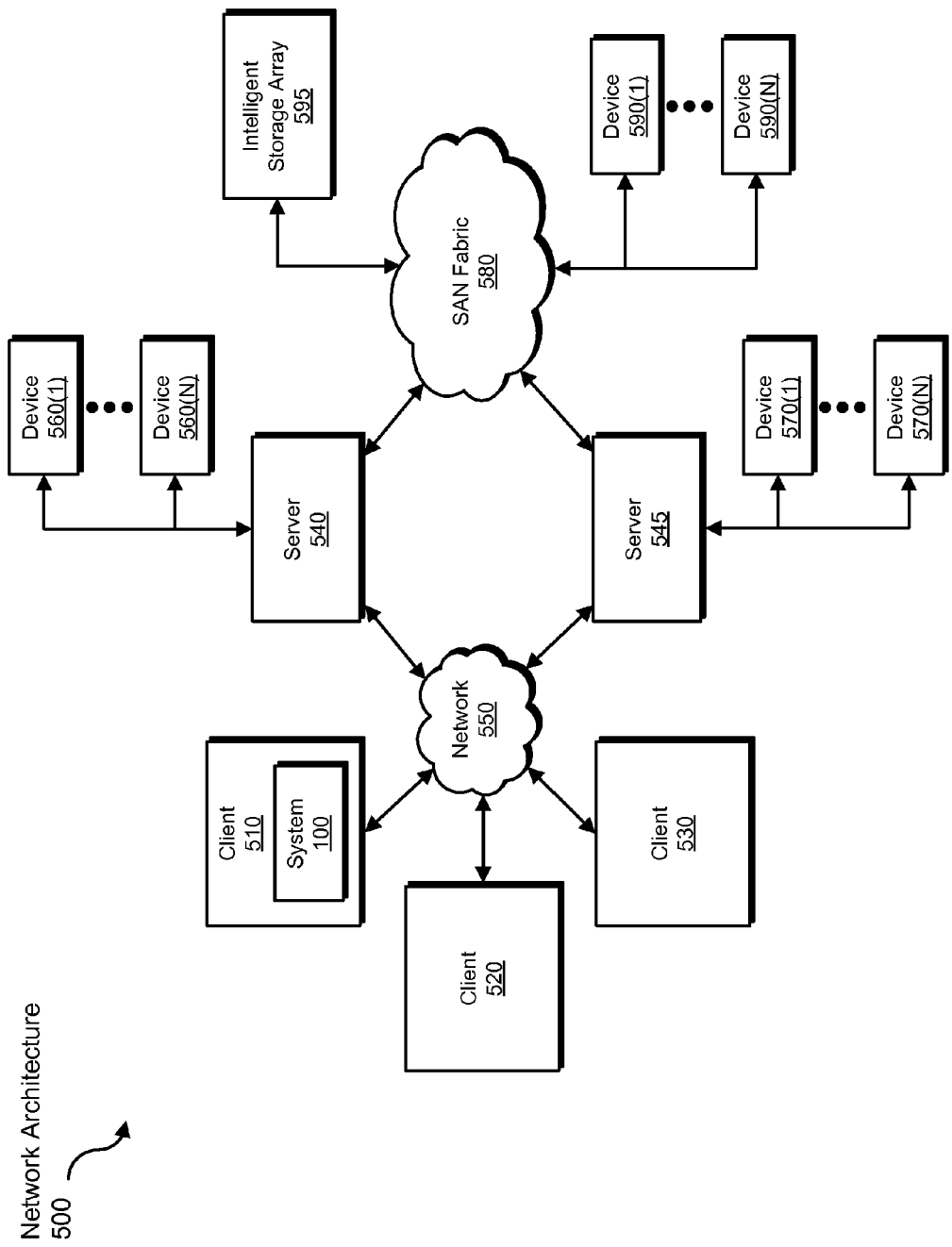

SYSTEMS AND METHODS FOR DETECTING DATA LEAKS

Individuals and entities increasingly share, access, and disseminate high volumes of electronic information. In addition, the ubiquity of high-speed Internet access, mobile devices, and portable storage has led to an increasingly mobile workforce. As a consequence, it has become more difficult than ever for organizations to prevent sensitive information from being lost and/or compromised.

For example, users may maliciously or unintentionally leak confidential data to unauthorized third parties via a variety of communication channels. In order to prevent these security breaches, conventional data loss prevention (DLP) systems typically monitor the flow of information over potentially insecure channels. When a security breach is detected, a DLP system may perform certain security measures, such as reporting the breach to administrators and/or preventing the offending user from accessing various networking, computing, and/or data resources.

Unfortunately, normal computing tasks performed by authorized users often result in accidental data leakage. However, if a DLP system detects and reports every such instance of data leakage, it will most likely report many false positives, and the resulting security measures performed by the DLP system may significantly disrupt the workflow of authorized users. While some DLP systems attempt to correct such over-reporting by relaxing their policies, malicious users may take advantage of these relaxed policies to periodically leak small portions of data over an extended period of time (a problem often referred to as "drip data leakage"), potentially resulting in significant data leaks. As such, the current disclosure identifies and addresses a need for more efficient and effective systems and methods for detecting data leaks.

SUMMARY

As will be described in greater detail below, the instant disclosure generally relates to systems and methods for both (1) detecting data leaks (by, e.g., tracking and accumulating both full and partial DLP policy violations) and (2) providing feedback to DLP administrators to restructure relaxed policies. In one example, a computer-implemented method for performing such a task may include (1) monitoring at least one data-distribution channel utilized by an entity, (2) detecting a plurality of full DLP policy violations and/or partial DLP policy violations committed by the entity by analyzing data distributed by the entity via the data-distribution channel, (3) determining that the entity's DLP policy violations cumulatively exceed a predetermined threshold, and (4) performing a security action in response to determining that the entity's DLP policy violations cumulatively exceed the predetermined threshold.

In some embodiments, monitoring the data-distribution channel utilized by the entity may include identifying and associating a plurality of data-distribution channels utilized by a user. In these embodiments, the systems described herein may determine that the entity's DLP policy violations cumulatively exceed the predetermined threshold by determining that DLP policy violations from each of the data-distribution channels associated with the user cumulatively exceed the predetermined threshold. In such embodiments, the plurality of data-distribution channels may include a computing device and/or a web account. In addition, in such embodiments identifying the plurality of data-distribution channels may include identifying login credentials of the user, identifying an IP address of a computing device of the user, and/or identifying packets within messages distributed by the user.

In some examples, determining that the entity's DLP policy violations cumulatively exceed the predetermined threshold may include assigning a weight to each DLP policy violation. The method may then include accumulating the weights of each DLP policy violation to determine that the cumulative weight exceeds the predetermined threshold. In these examples, the weight assigned to each DLP policy violation may be based on content of distributed data that violated the DLP policy, an amount of the distributed data, a recipient of the distributed data, a frequency with which the DLP policy violations occurred, a location at which the DLP policy violation occurred, and/or previous DLP policy violations committed by the entity.

In some embodiments, the predetermined threshold may include a number of DLP policy violations, an amount of distributed data that violates the DLP policies, and/or a frequency of distributed data that violates DLP policies. In some examples, performing the security action may include notifying the entity and/or an administrator that the entity's DLP policy violations cumulatively exceed the predetermined threshold, lowering the predetermined threshold for future DLP policy violations committed by the entity, and/or disabling the entity's access to the data-distribution channel and/or sensitive data.

In some embodiments, the method may further include determining that at least one DLP policy should be adjusted by analyzing DLP policy violations committed by multiple entities. The method may then include adjusting the DLP policy.

In one embodiment, a system for implementing the above-described method may include (1) a monitoring module that monitors at least one data-distribution channel utilized by an entity, (2) a detection module that detects a plurality of full DLP policy violations and/or partial DLP policy violations committed by the entity by analyzing data distributed by the entity via the data-distribution channel, (3) a determination module that determines that the entity's DLP policy violations cumulatively exceed a predetermined threshold, and (4) a security module that performs a security action in response to determining that the entity's DLP policy violations cumulatively exceed the predetermined threshold. In addition, the system may include at least one processor configured to execute the monitoring module, the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor at least one data-distribution channel utilized by an entity, (2) detect a plurality of full DLP policy violations and/or partial DLP policy violations committed by the entity by analyzing data distributed by the entity via the data-distribution channel, (3) determine that the entity's DLP policy violations cumulatively exceed a predetermined threshold, and (4) perform a security action in response to determining that the entity's DLP policy violations cumulatively exceed the predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary computing network capable of implementing one or more of the embodiments described and/or illustrated herein.

Figure 1:
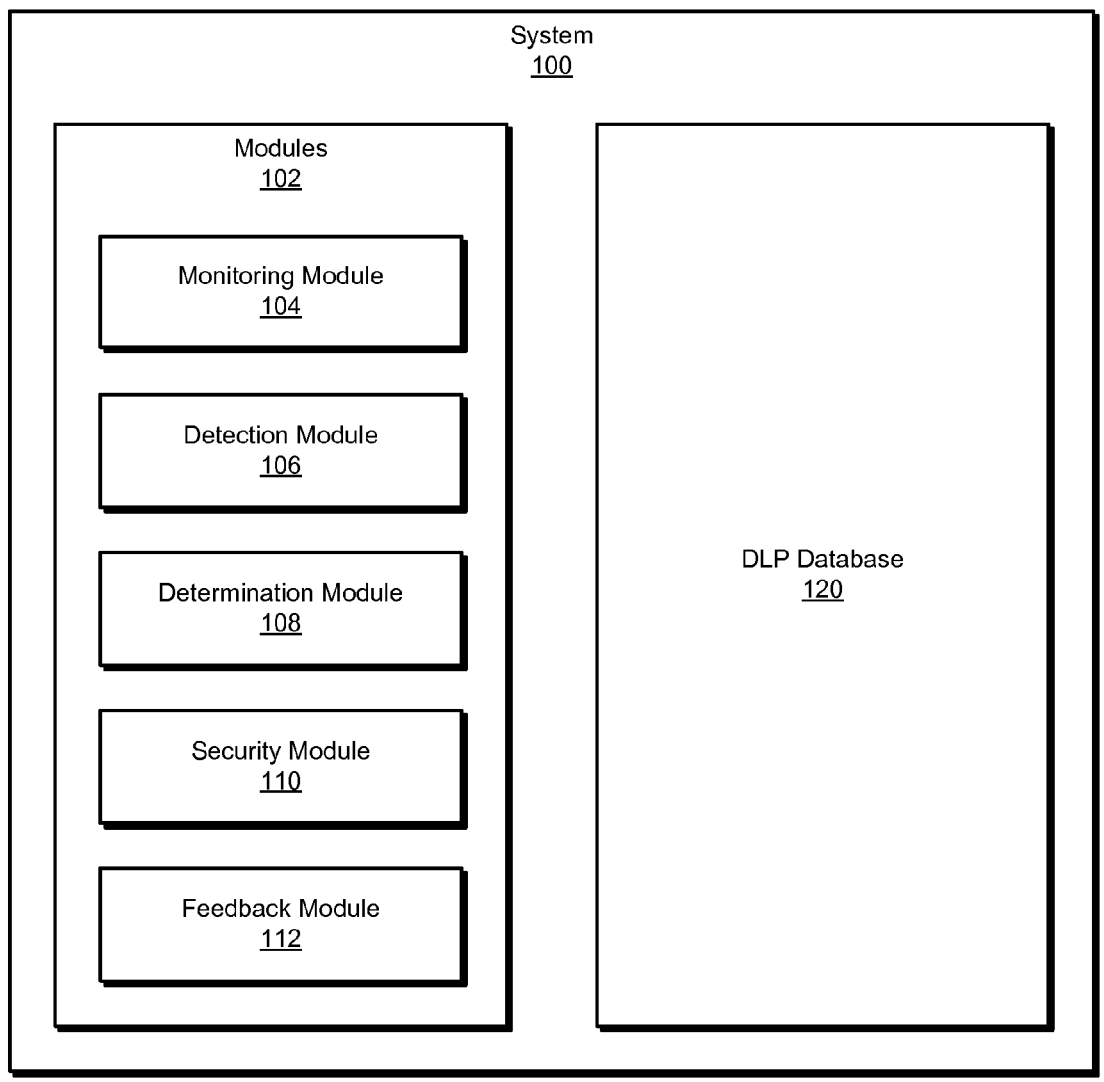
FIG. 1 is a block diagram of an exemplary system for detecting data leaks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting data leaks. As will be explained in greater detail below, by identifying and accumulating multiple full and/or partial DLP policy violations, the disclosed systems and methods may detect drip data leaks that may have gone undetected using traditional DLP systems. In addition, these systems and methods may avoid disrupting the workflow of authorized users by performing a security action only when the aggregate of multiple DLP policy violations has exceeded a threshold.

Figure 2A:
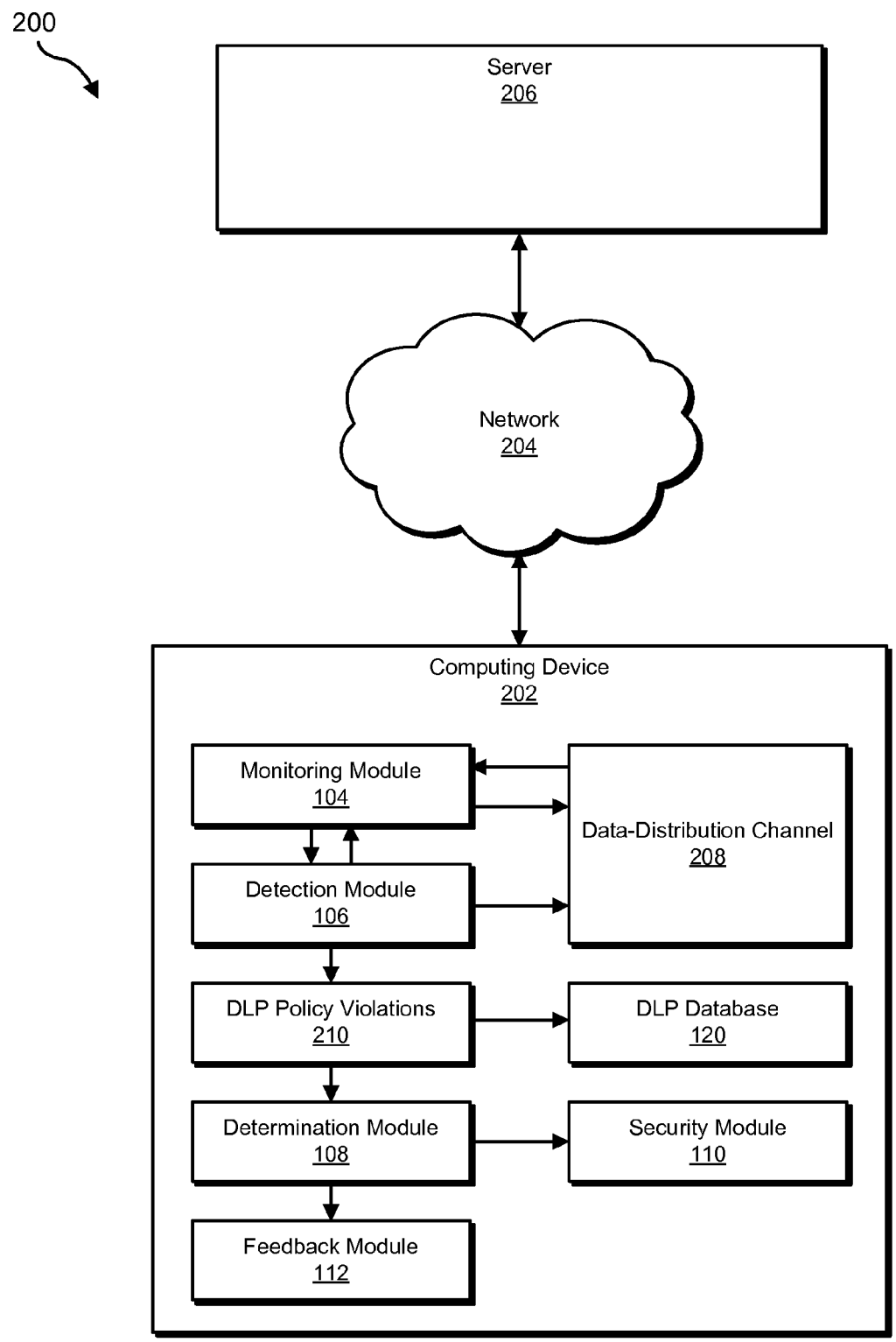
FIGS. 2A-2C are block diagrams of additional exemplary systems for detecting data leaks.
Figure 2B:
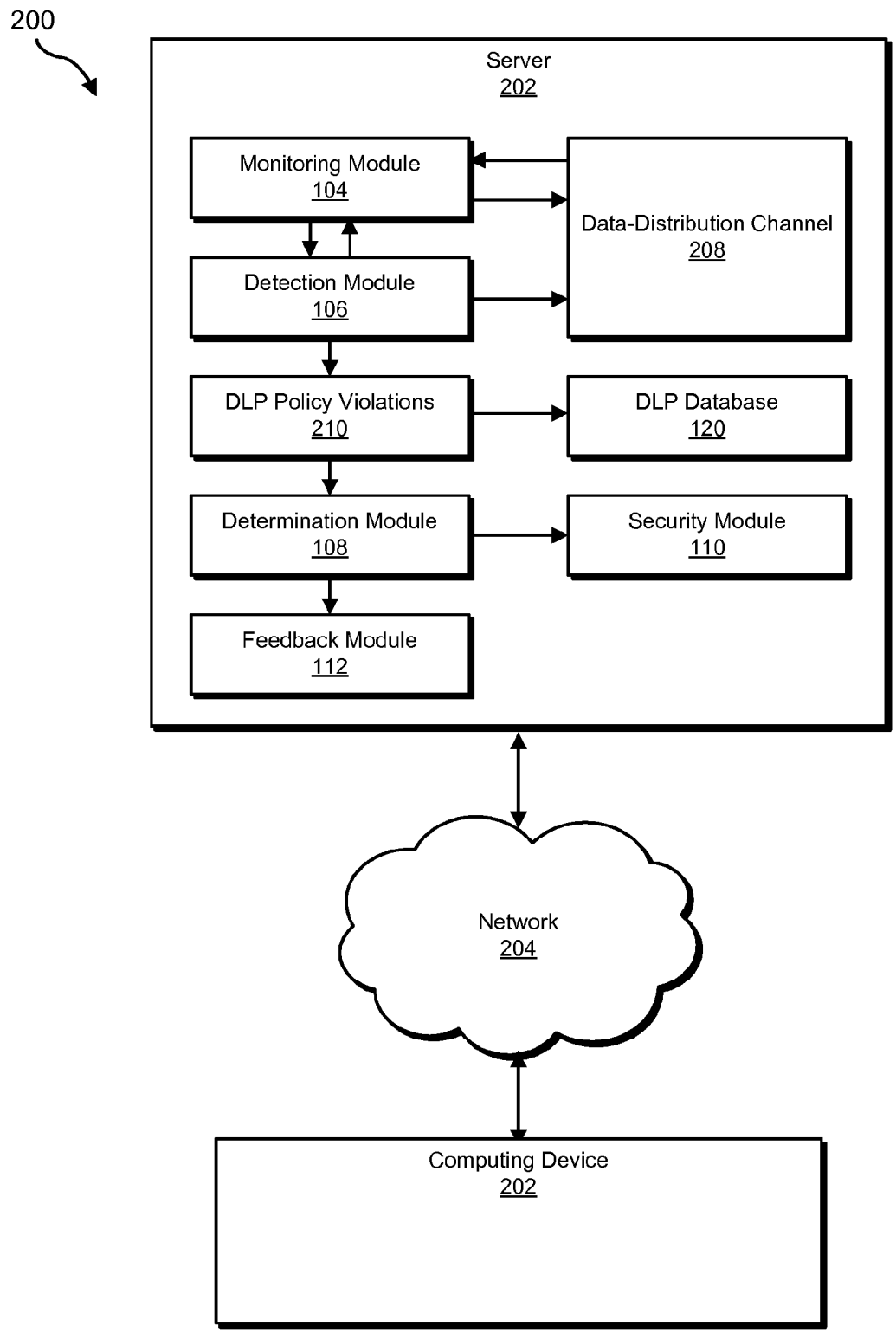
Figure 2C:
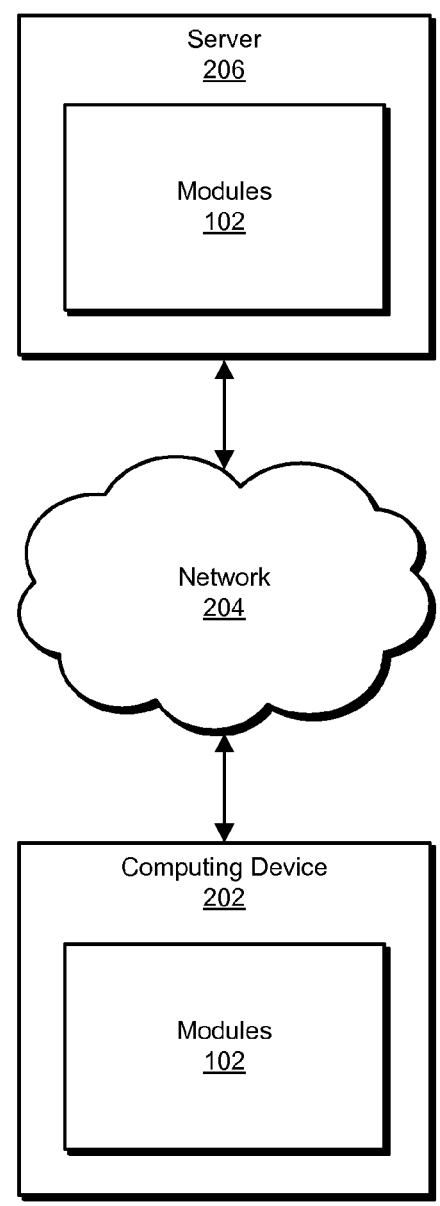

The following will provide, with reference to FIGS. 1-2C, detailed descriptions of exemplary systems for detecting data leaks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting data leaks. As illustrated in this figure, exemplary system 100 may include one or more modules 102 for performing one or more tasks. For example, and as will be explained in greater detail below, exemplary system 100 may include a monitoring module 104 that monitors at least one data-distribution channel utilized by an entity. Exemplary system 100 may also include a detection module 106 that detects a plurality of full and/or partial DLP policy violations committed by the entity by analyzing data distributed by the entity via the data-distribution channel.

In addition, and as will be described in greater detail below, exemplary system 100 may include a determination module 108 that determines that the entity's DLP policy violations cumulatively exceed a predetermined threshold. Exemplary system 100 may also include a security module 110 that performs a security action in response to determining that the entity's DLP policy violations cumulatively exceed the predetermined threshold. Finally, exemplary system 100 may include a feedback module 112 that notifies DLP administrators of, and/or automatically adjusts, relaxed DLP policies that require adjustment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2A-2C (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as DLP database 120. As will be described in greater detail below, DLP database 120 may be configured to store DLP policies. DLP database 120 may also be configured to record partial and full DLP policy violations and/or weights assigned to DLP violations committed by an entity. In addition, DLP database 120 may store associations between users, computing devices, and/or web accounts that may distribute data.

DLP database 120 may represent portions of a single database or computing device or a plurality of databases or computing devices. For example, DLP database 120 may represent a portion of computing device 202 and/or server 206 in FIGS. 2A-2C, computing system 410 in FIG. 4, and/or portions of exemplary network architecture 500 in FIG. 5. Alternatively, DLP database 120 in FIG. 1 may represent one or more physically separate devices capable of being accessed by a computing device, such as server 206 in FIGS. 2A-2C, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIGS. 2A-2C. As shown in FIGS. 2A-2C, system 200 may include a computing device 202 in communication with a server 206 via a network 204. In one example, illustrated in FIG. 2A, computing device 202 may be programmed with all of modules 102 and/or DLP database 120. Alternatively, as illustrated in FIG. 2B, server 206 may be programmed with all of modules 102 and/or DLP database 120.

In some examples, the functionality of modules 102 may be implemented across both computing device 202 and server 206 to most effectively detect data leaks. For example, as illustrated in FIG. 2C, one or more of modules 102 may be hosted and executed on both computing device 202 and server 206. In one embodiment, monitoring module 104 may be hosted on computing device 202 in order to identify data-distribution channels utilized by a user of computing device 202. Detection module 106 may be hosted and executed on both computing device 202 and server 206, as sensitive data may be distributed by the user from a computing device to server 206. In addition, determination module 108 may be implemented solely on server 206, as accumulating the DLP policy violations may be the most resource-intensive step of data leak detection process. Furthermore, security module 110 may be hosted and executed solely on computing device 202 in order to disable the user from distributing data via computing device 202. Finally, feedback module 112 may be implemented on both computing device 202 and server 206 in order to analyze DLP policy violations committed by multiple entities.

In one embodiment, one or more of modules 102 from FIG. 1 may, when executed by at least one processor of computing device 202 and/or server 206, enable computing device 202 and/or server 206 to detect data leaks. For example, and as will be described in greater detail below, monitoring module 104 may cause computing device 202 and/or server 206 to monitor at least one data-distribution channel (e.g., data distribution channel 208) utilized by an entity (e.g., computing device 202 and/or a user of the same). Detection module 106 may also cause computing device 202 and/or server 206 to detect a plurality of full and/or partial DLP policy violations (e.g., DLP policy violations 210) committed this entity by analyzing data distributed by the entity via the data-distribution channel. Next, determination module 108 may cause computing device 202 and/or server 206 to determine that the entity's DLP policy violations cumulatively exceed a predetermined threshold. In addition, security module 110 may cause computing device 202 and/or server 206 to perform a security action in response to determining that the entity's DLP policy violations cumulatively exceed the predetermined threshold.

In addition, FIGS. 2A and 2B show several examples of data flow between modules 102. In one example, monitoring module 104 may monitor data-distribution channel 208 by sending and receiving information to and from data-distribution channel 208. Monitoring module 104 and detection module 106 may then communicate back and forth in order for detection module 106 to detect DLP policy violations. In another embodiment, monitoring module 104 may receive information from data-distribution channel 208 and may then pass on the information to detection module 106. In addition, detection module 106 may communicate directly with data-distribution channel 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of identifying and/or analyzing data that is related to a DLP policy and/or an entity that may commit a DLP policy violation. Examples of server 206 include, without limitation, application servers, database servers, network servers, and messaging servers configured to provide various database and/or web services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
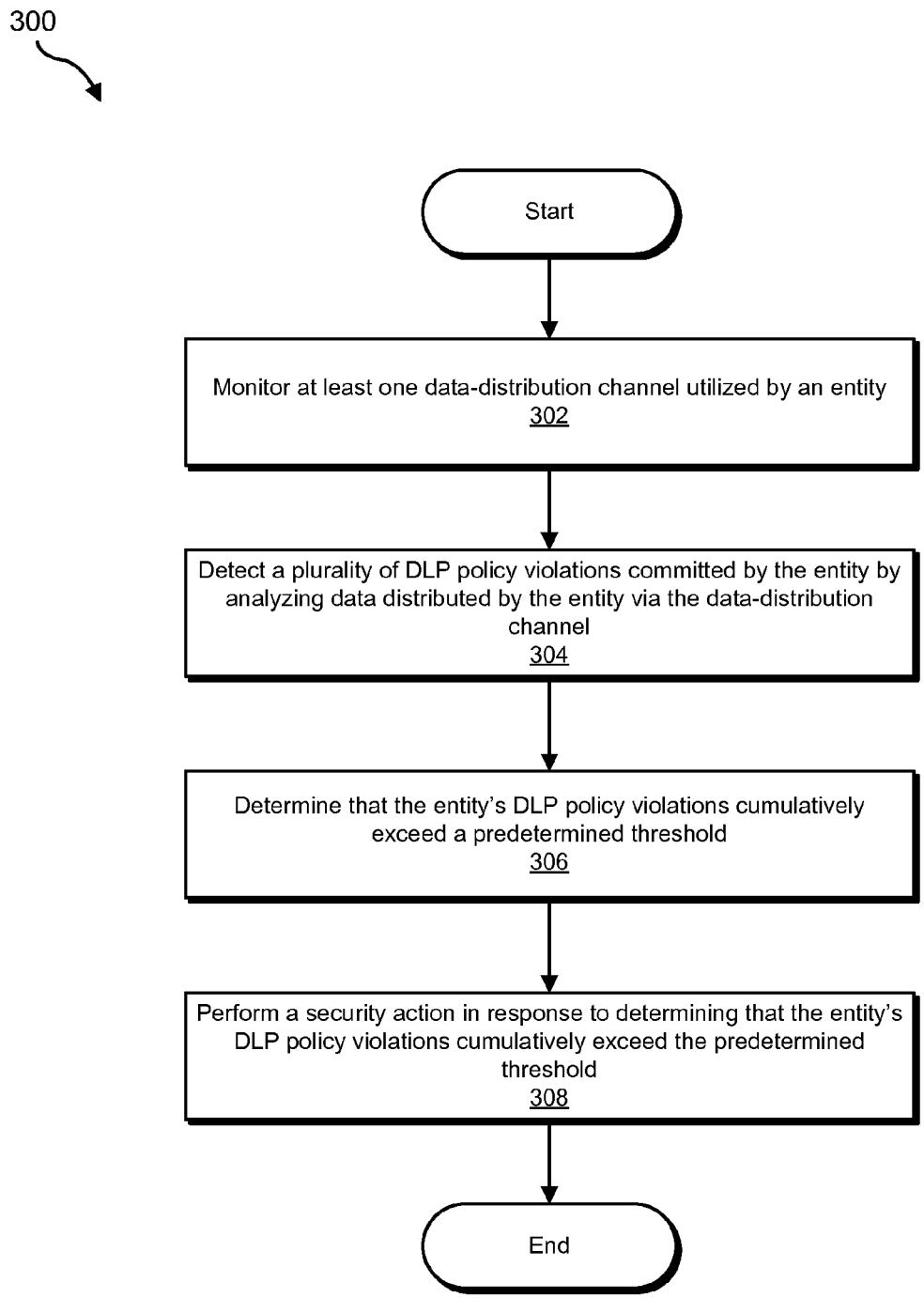
FIG. 3 is a flow diagram of an exemplary method for detecting data leaks.

FIG. 3 is a flow diagram of an exemplary computer-implemented method 300 for detecting data leaks. The steps shown in FIG. 3 may be performed by any suitable computer-executable code and/or computing system. In some embodiments, the steps shown in FIG. 3 may be performed by one or more of the components of system 100 in FIG. 1, system 200 in FIGS. 2A-2C, computing system 410 in FIG. 4, and/or portions of exemplary network architecture 500 in FIG. 5.

As illustrated in FIG. 3, at step 302 one or more of the systems described herein may monitor at least one data-distribution channel utilized by an entity. For example, monitoring module 104 may, as part of computing device 202 and/or server 206 in FIGS. 2A-2C, monitor a data-distribution channel 208 utilized by an entity.

The term "entity," as used herein, generally refers to any type or form of computing device, server, web account, application, or combinations thereof or user of the same, that is capable of distributing data via one or more data-distribution channels. For example, an entity may be a computing device or a user of a computing device. In addition, an entity may be the combination of a user and multiple communication channels associated with the user.

In addition, the phrase "data-distribution channel," as used herein, generally refers to any type or form of communication pathway, computing system, and/or executable code capable of dispersing digital information from one entity to another. Examples of data-distribution channels include, without limitation, computing devices, mobile communication devices, email accounts, text-messaging services, social networking platforms, Internet and Ethernet networks, servers, and/or any other suitable communication channel.

The systems described herein may monitor the data-distribution channel utilized by the entity in a variety of ways. In some examples, monitoring module 104 may identify and monitor a single data-distribution channel of an entity, such as by monitoring messages received by and distributed from a particular messaging account. In other examples, monitoring module 104 may identify and associate a plurality of data-distribution channels utilized by an entity. For example, monitoring module 104 may identify one or more computing devices and/or web accounts (e.g., email accounts, social networking accounts, etc.) that belong to a user. Monitoring module 104 may then form an association between the multiple data-distribution channels in order to detect data leaks committed by the user from multiple access points. In some examples, monitoring module 104 may store associations between multiple data-distribution channels utilized by an entity in DLP database 120.

In some embodiments, monitoring module 104 may identify the data-distribution channel utilized by the entity by identifying unique attributes that are indicative of a particular entity. For example, monitoring module 104 may identify a computing device of a user by identifying the login credentials that the user enters to access the computing device and/or by identifying an IP address of the computing device. In addition, monitoring module 104 may identify packets within messages distributed via a web account of the user that indicate the web account from which the messages were distributed. In some examples, identifying unique attributes that are indicative of a particular identify may allow monitoring module 104 to determine precisely which user distributed sensitive data from within a group of users (e.g., employees within an organization) that distribute data via the same network and/or server cluster.

Furthermore, monitoring module 104 may identify a geographical location that is unique to or indicative of the user, a personal (i.e., non-work related) computing device of the user, a mobile communication device of the user, and/or any additional identifier and/or data-distribution channel associated with an entity. Some malicious users may distribute sensitive data via a variety of channels in order to avoid detection. However, by identifying and monitoring a combination of the above-described data-distribution channels, the systems and methods described herein may detect data leaks committed by an entity whether the entity distributes sensitive data from a workplace, from home, while travelling, via a personal computer or cell phone, via an email account, via a social networking platform, and/or any other data-distribution channel.

Once monitoring module 104 has identified data-distribution channel 208, monitoring module 104 may monitor data-distribution channel 208 in a variety of ways. For example, if data-distribution channel 208 is a web account, monitoring module 104 may monitor data-distribution channel 208 by identifying messages and/or attachments within messages distributed by the entity. If data-distribution channel 208 is a computing device, monitoring module 104 may monitor files downloaded to and/or uploaded from the computing device Monitoring module 104 may also monitor files transferred to and from the computing device. In general, monitoring module 104 may monitor any type of data-distribution channel by identifying data distributed via the channel.

Returning to FIG. 3, at step 304 the one or more of systems described herein may detect a plurality of full DLP policy violations and/or partial DLP policy violations committed by the entity by analyzing data distributed by the entity via the data-distribution channel. For example, detection module 106 may detect DLP policy violations 210 committed by the entity by analyzing data distributed via data-distribution channel 208.

The systems described herein may analyze data distributed by the entity to detect DLP policy violations committed by the entity in a variety of ways. For example, detection module 106 may analyze the distributed data using Described Content Matching (DCM), Indexed Data Matching (IDM), Exact Data Matching (EDM), and/or Vector Machine Learning (VML) technologies.

In some embodiments, detection module 106 may further analyze the distributed data by identifying the recipient of the distributed data. Additionally or alternatively, detection module 106 may determine the amount (e.g., number of files and/or the size of the files) of distributed data, the location from which the data was distributed (e.g., a particular computing device or a geographical location), the time (e.g., during work hours or on a weekend), a frequency with which the entity distributes sensitive data, and/or any additional attribute of the distributed data that may indicate a data leak.

Once detection module 106 has analyzed the data distributed by the entity, detection module 106 may determine whether the entity has committed a DLP policy violation based on the analysis. For example, detection module 106 may compare the results of the analysis to a set of DLP policies stored in DLP database 120. The DLP policies may impose any set of restrictions on data distribution by an entity, such as limiting the amount and/or the content of distributed data. In addition, the DLP policies may take into consideration the position (e.g., security clearance or role within an organization) of the distributor and/or the receiver of the data, as well as any additional attribute of the distributed data, such as the location from which the data was distributed and/or the time at which the data was distributed. The DLP policies may be any set of DLP policies already implemented within an organization and/or they may be customized and tailored to embodiments of the present disclosure.

For example, a DLP policy may state that an entity may not distribute more than 1 MB of sensitive data to an unauthorized party. In this example, detection module 106 may determine that a user is attempting to send an email containing an attached file marked "confidential." In addition, detection module 106 may determine that the intended recipient has a low security clearance (i.e., unauthorized to view sensitive data) and that the confidential attachment contains 1.2 MB of data. Based on those determinations, detection module 106 may then determine that the user is violating a DLP policy by distributing more than 1 MB of confidential data to an unauthorized party.

In some embodiments, detection module 106 may determine whether distributed data partially or fully violates a DLP policy. In the above example, detection module 106 may determine that the user is fully violating the DLP policy because the confidential attachment contains more than 1 MB of data. However, in another example, the user may only distribute 0.8 MB of data to an unauthorized user. In this case, detection module 106 may determine that the user has only partially violated the DLP policy.

As an additional example, a set of DLP policies may contain a policy that restricts a user from distributing the credit card information of more than 50 customers via any data-distribution channel. If the user distributes the credit card information of 25 customers via a removable device and later distributes the credit card information of an additional 26 customers via a messaging account, detection module 106 may determine that the user has partially violated the DLP policy twice. Since the user distributed the credit card information of more than 50 customers in total, detection module 106 may record the two partial DLP policy violations as a full DLP policy violation. In general, detection module 106 may record a full DLP policy violation in response to detecting any combination of partial violations that amount to a full violation.

In addition to detecting full and partial DLP policy violations, detection module 106 may record the time and severity of each DLP policy violation committed by an entity in DLP database 120. Traditional DLP systems may only detect and/or mitigate full DLP policy violations; however, by identifying and recording partial DLP policy violations, the systems described herein may detect legitimate data leaks that comprise multiple smaller data distributions over an extended period of time.

Returning to FIG. 3, at step 306 one or more of the systems described herein may determine that the entity's DLP policy violations cumulatively exceed a predetermined threshold. For example, determination module 108 may determine that DLP policy violations 210 cumulatively exceed the predetermined threshold.

The systems described herein may determine that the entity's DLP policy violations cumulatively exceed a predetermined threshold in a variety of ways. In some examples, determination module 108 may determine that the DLP policy violations from a single data-distribution channel cumulatively exceed the predetermined threshold. However, if monitoring module 104 identified and associated a plurality of data-distribution channels associated with a user, determination module 108 may determine that the DLP policy violations from each of the data-distribution channels associated with the user cumulatively exceed the predetermined threshold.

In some embodiments, determination module 108 may accumulate the entity's DLP policy violations by assigning a weight to each DLP policy violation and accumulating each assigned weight. For example, if an entity has partially violated a DLP policy, determination module 108 may quantify the degree to which the entity violated the policy and/or the relative threat imposed by the DLP policy violation by assigning a numerical weight to the violation. In some embodiments, the weight assigned to each DLP policy violation may be based on content of the distributed data that violated the DLP policy, an amount of the distributed data, a recipient of the distributed data, a frequency with which the DLP policy occurred, a location at which the DLP policy violation occurred, previous DLP policy violations committed by the entity, and/or any additional measure of the violation For example, if an entity partially violates a DLP policy prohibiting the distribution of more than 5 MB of sensitive data by distributing 2 MB of sensitive data, determination module 108 may assign a weight of "0.4" (i.e., 2 MB/5 MB) to the violated DLP policy.

In some examples, the predetermined threshold may be based on the weights assigned to each DLP policy violation. For example, determination module 108 may weight and accumulate partial and full DLP policy violations until the cumulative weight reaches "1" (e.g., the weight assigned to a full violation). Additionally or alternatively, the predetermined threshold may be based on a cumulative number (e.g., 4 partial violations or 2 full violations) of DLP policy violations, an amount (e.g., 10 MB) of distributed data that violates DLP policies and/or a frequency (e.g., 10 MB/month) of distributed data that violates DLP policies. The predetermined threshold may be based on any combination of weights, numbers, amounts, frequencies, or additional metrics used to quantify DLP policy violations.

Returning to FIG. 3, at step 308 one or more of the systems described herein may perform a security action in response to determining that the entity's DLP policy violations cumulatively exceed the predetermined threshold. For example, security module 110 may perform a security action in response to determining that DLP policy violations 210 exceed the predetermined threshold.

The systems described herein may perform a variety of security actions in response to determining that the entity's DLP policy violations cumulatively exceed the predetermined threshold. For example, the entity may have accidentally committed and/or may be unaware of committing the DLP policy violations. As such, security module 110 may first notify the entity that the entity's DLP policy violations cumulatively exceed the predetermined threshold so that the entity can take appropriate action to prevent future accidental data leaks. Security module 110 may also lower the threshold for future DLP policy violations and/or perform a more severe security action following future DLP policy violations committed by the entity.

Additionally or alternatively, security module 110 may notify an administrator that the entity's DLP policy violations cumulatively exceed the predetermined threshold. Security module 110 may also disable the entity's access to one or more data-distribution channels and/or sensitive data, such as by disabling the entity's access a computing device and/or the Internet. In addition, security module 110 may perform any other suitable security measure to prevent further data leaks.

Furthermore, the systems described herein may monitor and analyze data-distribution channels and DLP policy violations associated with multiple entities within an organization. As a result of this analysis, feedback module 112 may detect trends of data-distribution behavior and may use such trends to adjust DLP policies and/or predetermined thresholds.

For example, feedback module 112 may determine that multiple users within an organization frequently partially and/or fully violate particular DLP policies. Feedback module 112 may then automatically restructure and/or suggest to an administrator to restructure the DLP policies by adding, removing, or modifying the rules within the policies. Specifically, feedback module 112 may remove or lower (or suggest to an administrator to remove or lower) the weights assigned to the policy violations if determination module 108 determines that the distributed data that violated the DLP policies does not actually pose a security threat. Additionally or alternatively, feedback module 112 may add policies and/or increase the weights assigned to the policy violations (or suggest to an administrator to add policies and/or increase the weights assigned to the policy violations) if feedback module 112 determines that the partial DLP policy violations indicate a legitimate data leak.

Similarly, feedback module 112 may configure (or suggest to an administrator to configure) the weights assigned to policy violations and/or the predetermined thresholds to be applicable for a predetermined amount of time, such as a day, a week, or a month. For example, feedback module 112 may temporarily impose a lower threshold on a particular user, as a warning or probationary measure, in response to the user having previously violated DLP policies. Additionally or alternatively, feedback module 112 may increase or remove the threshold for a particular user if the user has a legitimate requirement to share sensitive data. Feedback module 112 may adjust one or more DLP policies and/or predetermined thresholds in any suitable manner to more effectively detect data leaks.

The systems and methods disclosed herein may be implemented in a variety of ways and provide a number of advantages. For example, by associating multiple data-distribution channels utilized by an entity, the systems and methods described herein may detect sensitive data distributed via a variety of channels by a single user. In addition, the systems and methods described herein may detect drip data leaks by identifying and accumulating multiple small data leaks. Furthermore, by waiting to perform a security action until after an entity exceeds a predetermined threshold, the disclosed systems and methods may reduce unnecessary and bothersome DLP prevention measures while not sacrificing the strictness of DLP policies.

Figure 4:
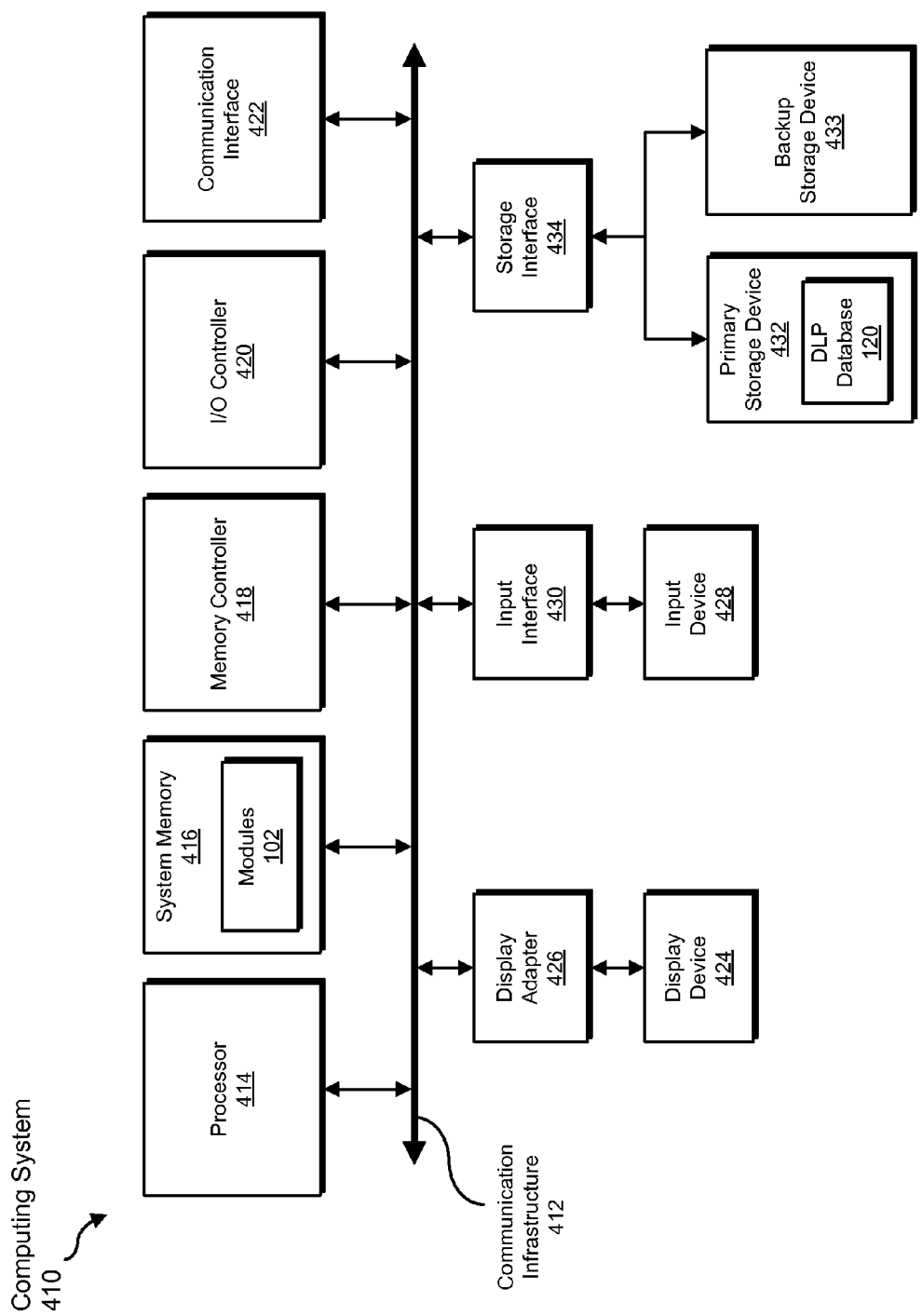
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, DLP database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560 (1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590 (1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting data leaks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify data distributed by an entity, analyze the distributed data, transform the analysis into full and/or partial DLP policy violations, store the DLP violations in a database, and use the DLP violations to prevent future data leaks by performing security actions against the entity. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting data leaks, at least a portion of the method being performed by a computing device comprising at least one processor, the method comprising:
    identifying a plurality of computing devices that include multiple data-distribution channels utilized by at least one user within an organization;
    associating the multiple data-distribution channels with the user within the organization;
    monitoring the multiple data-distribution channels associated with the user within the organization;
    detecting, by analyzing data distributed from the plurality of computing devices by the user via the multiple data-distribution channels, a plurality of partial data loss prevention (DLP) policy violations committed by the user, wherein a partial DLP policy violation comprises a violation of a DLP policy that does not amount to a full violation of the DLP policy;
    assigning a weight to each of the plurality of partial DLP policy violations that quantifies a degree to which the user violated the DLP policy;
    determining that the weights of the user's DLP policy violations cumulatively exceed a predetermined threshold;
    performing a security action in response to determining that the weights of the user's DLP policy violations cumulatively exceed the predetermined threshold.

2. The method of claim 1, wherein the multiple data-distribution channels comprise at least one of:
    a messaging account of the user;
    a social networking account of the user;
    a network accessed by the user;
    a server accessed by the user.

3. The method of claim 1, wherein identifying the multiple data-distribution channels comprises at least one of:
    identifying login credentials of the user;
    identifying an IP address of at least one of the plurality of computing devices of the user;
    identifying packets within messages distributed by the user.

4. The method of claim 1, wherein the weight assigned to each partial DLP policy violation is based on at least one of:
    content of distributed data that violated the DLP policy;
    an amount of the distributed data;
    a recipient of the distributed data;
    a frequency with which the DLP policy violations occurred;
    a location at which the DLP policy violation occurred;
    previous DLP policy violations committed by the user.

5. The method of claim 1, wherein the predetermined threshold is based on at least one of:
    a number of DLP policy violations;
    an amount of distributed data that violates DLP policies;
    a frequency of distributed data that violates DLP policies.

6. The method of claim 1, wherein performing the security action comprises at least one of:
    notifying the user that the weights of the user's DLP policy violations cumulatively exceed the predetermined threshold;
    notifying an administrator that the weights of the user's DLP policy violations cumulatively exceed the predetermined threshold;
    lowering the predetermined threshold for future DLP policy violations committed by the user;
    disabling the user's access to at least one of:
        at least one data-distribution channel;
        sensitive data.

7. The method of claim 1, further comprising:
    determining, by analyzing DLP policy violations committed by multiple users, that at least one DLP policy is required to be adjusted;
    adjusting the DLP policy.

8. The method of claim 7, wherein:
    determining that the DLP policy is required to be adjusted comprises determining that multiple users have partially violated the DLP policy;
    adjusting the DLP policy comprises increasing the weights assigned to partial violations of the DLP policy.

9. The method of claim 7, wherein:
    determining that the DLP policy is required to be adjusted comprises determining that distributed data that violates the DLP policy does not actually pose a security threat;
    adjusting the DLP policy comprises removing the DLP policy.

10. The method of claim 1, further comprising a feedback module that:
    determines, by analyzing DLP policy violations committed by multiple users, that at least one DLP policy is required to be adjusted;
    adjusts the DLP policy.

11. The method of claim 1, wherein the plurality of computing devices comprises at least one of:
    a work-related computing device of the user;
    a personal computing device of the user;
    a mobile communication device of the user.

12. The method of claim 1, wherein:
    a DLP policy prohibits the user from distributing more than a certain amount of sensitive data;
    detecting one of the plurality of partial DLP policy violations comprises determining that the user distributed an amount of sensitive data that is less than the certain amount of sensitive data;
    assigning the weight to the partial DLP policy violation comprises weighting the partial DLP policy violation based on a ratio of the amount of sensitive data distributed by the user to the certain amount of sensitive data.

13. The method of claim 1, wherein determining that the weights of the user's DLP policy violations cumulatively exceed the predetermined threshold comprises determining that the user committed a plurality of partial violations of DLP policies with weights that are cumulatively equivalent to a full violation of a DLP policy.

14. A system for detecting data leaks, the system comprising:
    a monitoring module, stored in memory, that:
        identifies a plurality of computing devices that include multiple data-distribution channels utilized by at least one user within an organization;
        associates the multiple data-distribution channels with the user within the organization;
        monitors the multiple data-distribution channels associated with the user within the organization;
    a detection module, stored in memory, that detects a plurality of partial data loss prevention (DLP) policy violations committed by the user by analyzing data distributed from the plurality of computing devices by the user via the multiple data-distribution channels, wherein a partial DLP policy violation comprises a violation of a DLP policy that does not amount to a full violation of the DLP policy;
    a determination module, stored in memory, that:
        assigns a weight to each of the plurality of partial DLP policy violations that quantifies a degree to which the user violated the DLP policy;
        determines that the weights of the user's DLP policy violations cumulatively exceed a predetermined threshold;
    a security module, stored in memory, that performs a security action in response to determining that the weights of the user's DLP policy violations cumulatively exceed the predetermined threshold;
    at least one processor configured to execute the monitoring module, the detection module, the determination module, and the security module.

15. The system of claim 14, wherein the multiple data-distribution channels comprise at least one of:
    a messaging account of the user;
    a social networking account of the user;
    a network accessed by the user;
    a server accessed by the user.

16. The system of claim 14, wherein the monitoring module identifies the multiple data-distribution channels by at least one of:
    identifying login credentials of the user;
    identifying an IP address of at least one of the plurality of computing devices of the user;
    identifying packets within messages distributed by the user.

17. The system of claim 14, wherein the determination module assigns the weight to each partial DLP policy violation based on at least one of:
    content of distributed data that violated the DLP policy;
    an amount of the distributed data;
    a recipient of the distributed data;
    a frequency with which the DLP policy violations occurred;
    a location at which the DLP policy violation occurred;
    previous DLP policy violations committed by the user.

18. The system of claim 14, wherein the predetermined threshold is based on at least one of:
    a number of DLP policy violations;
    an amount of distributed data that violates DLP policies;
    a frequency of distributed data that violates DLP policies.

19. The system of claim 14, wherein the security module performs the security action by at least one of:
    notifying the user that the weights of the user's DLP policy violations cumulatively exceed the predetermined threshold;
    notifying an administrator that the weights of the user's DLP policy violations cumulatively exceed the predetermined threshold;
    lowering the predetermined threshold for future DLP policy violations committed by the user;
    disabling the user's access to at least one of:
        at least one data-distribution channel;
        sensitive data.

20. A non-transitory computer-readable storage medium comprising one or more computer-executable instructions that, when executed by at least one processor of a computing device, cause the computing device to:
    identify a plurality of computing devices that include multiple data-distribution channels utilized by at least one user within an organization;
    associate the multiple data-distribution channels with the user within the organization;
    monitor the multiple data-distribution channels associated with the user within the organization;
    detect, by analyzing data distributed from the plurality of computing devices by the user via the multiple data-distribution channels, a plurality of partial data loss prevention (DLP) policy violations committed by the user, wherein a partial DLP policy violation comprises a violation of a DLP policy that does not amount to a full violation of the DLP policy;
    assign a weight to each of the plurality of partial DLP policy violations that quantifies a degree to which the user violated the DLP policy;
    determine that the weights of the user's DLP policy violations cumulatively exceed a predetermined threshold;
    perform a security action in response to determining that the weights of the user's DLP policy violations cumulatively exceed the predetermined threshold.

* * * * *